United States Patent
Lu

(10) Patent No.: US 8,335,178 B2
(45) Date of Patent: Dec. 18, 2012

(54) BANDWIDTH REQUESTS IN MULTI-HOP WIRELESS COMMUNICATION SYSTEMS

(75) Inventor: Yanling Lu, Beijing (CN)

(73) Assignee: Fujitsu Limited, Kawasaki (JP)

( * ) Notice: Subject to any disclaimer, the term of this patent is extended or adjusted under 35 U.S.C. 154(b) by 763 days.

(21) Appl. No.: 12/411,037

(22) Filed: Mar. 25, 2009

(65) Prior Publication Data

US 2009/0245164 A1    Oct. 1, 2009

(30) Foreign Application Priority Data

Mar. 27, 2008  (EP) .................................. 08153427

(51) Int. Cl.
*H04B 7/14*   (2006.01)
(52) U.S. Cl. .......................................... 370/315; 455/15
(58) Field of Classification Search .................. 370/310, 370/315, 328, 329, 331; 455/7, 15, 16, 403, 455/421, 422.1, 435.1
See application file for complete search history.

(56) References Cited

U.S. PATENT DOCUMENTS

| 8,009,645 | B2 * | 8/2011 | Lee et al. | 370/338 |
| 2002/0187746 | A1 * | 12/2002 | Cheng et al. | 455/11.1 |

FOREIGN PATENT DOCUMENTS

| CN | 101414956 A | 4/2009 |
| EP | 1773091 A | 4/2007 |
| EP | 1873978 A | 1/2008 |
| EP | 1898561 | 3/2008 |
| GB | 2440983 A | 2/2008 |
| WO | 2004088935 A | 10/2004 |
| WO | 2006043903 A | 4/2006 |
| WO | 2006045499 | 5/2006 |
| WO | 2007141617 A | 12/2007 |

OTHER PUBLICATIONS

Extended European Search Report corresponding to EP Appln. No. 08153427.3-2416 dated Nov. 7, 2008.
Chinese Notification of the First Office Action dated Jun. 24, 2011 for application No. 200910133959.1.

* cited by examiner

*Primary Examiner* — Chi Pham
*Assistant Examiner* — Weibin Huang
(74) *Attorney, Agent, or Firm* — Murphy & King, P.C.

(57) ABSTRACT

A user terminal (MS) is in wireless communication with a relay station (Access RS), the relay station being in communication with a super-ordinate station such as a base station (MR-BS) such that the user terminal can perform either single-hop communication with the access relay station or multi-hop communication with the super-ordinate station. The system defines at least one specific signal to be used in a bandwidth request for multi-hop and/or single hop communication. When the user terminal needs bandwidth, it issues a bandwidth request to the relay station indicating a single hop or multi-hop communication by including or not including the specific signal. The relay station decides whether or not to issue its own bandwidth request to the super-ordinate station based on the presence or absence of the specific signal.

13 Claims, 7 Drawing Sheets

BANDWIDTH REQUESTS IN MULTI-HOP WIRELESS COMMUNICATION SYSTEMS

FIELD OF THE INVENTION

Currently there exists significant interest in the use of multi-hop techniques in packet based wireless communication systems, where it is expected that such techniques will enable both extension in coverage range and/or increase in system capacity (throughput). Where a single "hop" denotes a direct link between two nodes in a wireless communication system such as a base station (BS) and a mobile station (MS), multi-hop involves the use of relay stations (RS) added to the conventional wireless communication system configuration of base stations and mobile stations. The present invention relates to allocation of bandwidth in multi-hop systems.

BACKGROUND OF THE INVENTION

In a multi-hop communication system, communication signals are transmitted along a communication path or link from a source apparatus to a destination apparatus via one or more intermediate apparatuses or nodes. FIG. 1a illustrates a single-cell two-hop wireless communication system comprising a base station BS 10, a relay station RS 30, and a mobile station MS 20, also referred to as user equipment (UE). Such a system, employing mobile stations as well as relay stations (fixed or mobile) in a multi-hop arrangement, is called a mobile multi-hop relay (MR) system. By including the RS 30 in the communications chain, the BS 10 can serve an MS outside its normal range, for example when the MS is located indoors where signals from the BS do not reach sufficiently. For simplicity, FIG. 1a indicates only the downlink, in other words a communications channel from the BS 10 via the RS 30 to the MS 20. In practice, however, an uplink (channel from the MS back to the BS) is normally present as well, though this need not necessarily be routed via the same RS 30. In some wireless communication systems, notably those using WiMAX technology (IEEE 802.16 and its variants), a link such as RS-MS terminating at an MS is called an access link, and in this case the RS is also referred to as an access RS. Meanwhile, the link BS-RS between the BS and RS is called a relay link.

It is possible for more than one RS 30 to be involved in the communications chain from BS 10 to MS 20 and in this case a relay link RS-RS is defined between each two RSs in the chain. Moreover, it is possible for more than one access link to be established simultaneously to the same MS 20, e.g. from different relay stations (this is called co-operative relay). Different communication paths may exist for user data (data useful to the user, such as a voice call or video stream), and control information (for signalling purposes and housekeeping in the system).

In practice, of course, several BSs, RSs and MSs are combined to form a larger system, and communication links between nodes (wireless transceiver units) in the system are continually formed and re-formed as user demands and locations (and thus the positions of MSs relative to the other nodes) change. Typically, multiple MSs are associated (or "attached") to each RS (access RS) 30. In addition to data transmissions via the downlink and uplink, various control signals are exchanged between the nodes of the system. The BSs are normally in mutual communication via a wired backbone network in addition to being able to communicate wirelessly.

In FIG. 1a, the RS 30 is assumed to be fixed, as would be the case if installed in an office building for example, but FIG. 1b shows a variation of the FIG. 1a scheme in which the RS itself is mobile, for example installed in a vehicle. In this case, the RS is referred to as a Mobile Relay Station MRS 300. An MRS 300 installed in a bus, for example, may serve several MSs 20 which move along with the MRS. The BS may be relabeled as an MR-BS 100 to denote that it has the capability to support relay stations. In the remainder of this specification, the term BS is used synonymously with MR-BS. Also, the term RS includes MRS wherever appropriate; for example, an RS-RS link may be formed with an MRS at either or both ends. Mobile multi-hop relay can be summed up as the concept of relaying user data between an MS and MR-BS, and possibly control information between an MR-BS and an MS or RS, through one or more RSs. It may be possible to establish multiple communication paths between an MR-BS 100 and an MS 20, including possibly a direct path not involving an RS such as the MRS 300, and to communicate the same user data and/or control information though the multiple paths to improve performance.

Another issue in multi-hop systems is whether or not each MS is "relay aware", in other words whether or not the MS knows that it is communicating with a RS rather than directly with the BS. Clearly, a "relay aware" system places greater demands on the mobile stations and is less likely to be compatible with legacy hardware. Variations of the 802.16 standard currently under development include 802.16j and 802.16m. In 802.16j, the MSs are not relay-aware, that is they are not aware of the presence of relay stations in the network. By contrast, in 802.16m the MS are assumed to know when they are communicating with an RS and to be able to adapt their behavior accordingly. The invention to be described is most readily applicable to such "relay aware" systems. As 802.16m is expected to use many of the same principles and techniques of 802.16j, reference will be made in the following description to various features already proposed for 802.16j.

In any IEEE802.16-based system, data is transmitted in units of frames divided into downlink (DL) and uplink (UL) sub-frames which can either be simultaneous (FDD) or consecutive (TDD or H-FDD). Each DL sub frame may start with a preamble followed by a Frame Control Header (FCH), and a DL-MAP and UL_MAP to indicate the subsequent frame structure. In addition, a downlink channel descriptor DCD and uplink channel descriptor UCD are periodically sent to indicate burst profiles (modulation and error-correction schemes) employed.

FIG. 2 illustrates a number of applications for relay stations. For fixed infrastructure, the coverage provided by a relay station may be "in-fill" to allow access to the communication network for mobile stations which may otherwise be in the shadow of other objects or otherwise unable to receive a signal of sufficient strength from the base station despite being within the normal range of the base station. This is shown in the top half of FIGS. 2a and 2b. "Range extension" is also shown, in which a relay station allows access when a mobile station is outside the normal data transmission range of a base station. One example of in-fill shown in the top half of FIG. 2b is positioning of a nomadic relay station to allow penetration of coverage within a building that could be above, at, or below ground level. Conversely, a relay station may be used on the uplink to allow low power transmissions from an MS to be picked up and passed on to a BS. In this way, the size of the cell served by the BS is effectively increased. The area of coverage of the BS and all of its associated relay stations is called an MR-cell.

Other applications are nomadic relay stations which are brought into effect for temporary cover, providing access during events or emergencies/disasters, as illustrated in FIG.

2a. Such a nomadic RS would normally be considered as fixed for control purposes, as it will not move over short timescales.

A final application shown in the lower half of FIG. 2b provides access to a network using a MRS positioned on a vehicle. Coverage is provided for MS devices which are travelling together on a mobile vehicle, such as a bus or a train. The MRS is mounted on the vehicle and it connects to an MR-BS or another RS via a mobile relay link. The MRS provides an access link to MS/SS devices riding on the platform. This is another instance of in-fill, because in the vehicle, each MS may be unable to receive a sufficient signal strength even if the vehicle is within the coverage range of an MR-BS or RS. The MRS is able to receive the signal from the MR-BS/RS and can communicate at the same time with the mobile stations in the vehicle.

As users' needs in such a network change, for example as they request new or additional services, the amounts of data being received and transmitted and hence their bandwidth (BW) requirements also change. In a system of the FIG. 1/FIG. 2 type, bandwidth requests may be directed first from an MS to the RS and from there to the MR-BS. Here, the requests are generally for uplink bandwidth since the MR-BS (or possibly, RS) will itself determine the allocations of bandwidth on the downlink, taking into account the services currently being provided to users.

For simplifying the discussion of bandwidth requests, it may be helpful to think of "subordinate" and "super-ordinate" stations or nodes in the system. Here, the term "super-ordinate" refers to any "higher" or "upstream" node (where "downstream" is normally thought of as the direction leading to the MS). Conversely, "subordinate" refers to a "lower" node, in other words a node "downstream" of another node. The MS or RS is referred to as a subordinate station of the MR-BS, which is also referred to as their super-ordinate station. The RS, in turn, is a super-ordinate station with respect to the MS. In a link of more than two hops, one RS will be a super-ordinate node of another RS.

In a wireless relay system, there are several ways for a subordinate station (MS or RS) to obtain bandwidth from a super-ordinate station (RS or MR-BS), and these can be summarized as follows:

Dedicated bandwidth: After the subordinate station is attached to the network initially in a network entry procedure, the system will allocate dedicated bandwidth to the station automatically. At this stage, there is no explicit bandwidth request. When dedicated bandwidth needs to be adjusted, there are two schemes to trigger bandwidth reallocation. One involves the MR-BS (or RS) monitoring other relevant messages from their subordinate stations, the other is for the MS (or RS) to request bandwidth explicitly by sending a bandwidth request header (see below). As for the former possibility, the system (more particularly, the super-ordinate MR-BS) extracts useful information from the relevant messages and reallocates the current dedicated bandwidth accordingly.

Bandwidth request header: With this 48-bit length header issued by a downstream node (e.g. MS), the super-ordinate station can know the amount of bandwidth requested by the downstream node, because there is an explicit bandwidth number (either incremental or aggregate) in the header. In some cases, the allocation period (time of validity of the allocation) is also included. In addition, the super-ordinate station can identify the connection (and hence the downstream node) for which bandwidth is requested, by a connection ID (CID) included in the bandwidth request header.

Bandwidth request message: Usually, the message's length is not fixed. In different cases, the message can carry different information. The system needs to monitor it and identify the bandwidth requested.

CDMA Bandwidth Request: The subordinate node needs to select one CDMA ranging code from a special CDMA ranging code subset and send this code in a special region in the uplink frame. When the super-ordinate node receives this code correctly, it should allocate a fixed small amount of bandwidth sufficient to provide a request opportunity allowing the subordinate node to send a bandwidth request header, for which see above. The subordinate node can transmit other messages/headers or data on this bandwidth depending on its decision as well.

The details of the BW request procedure will depend on whether or not the MS are relay-aware. For the moment, let us consider an 802.16j system, in which the mobile stations are not relay aware.

In an IEEE 802.16j system, there are two scheduling modes:

Distributed scheduling mode: A mode of operation applicable to multi-hop relay where the MR-BS and each RS in the MR-cell (with or without information from the MR-BS) determine the bandwidth allocations and generate the corresponding MAPs for the access link to/from their subordinate MSs and/or relay links to/from their subordinate RSs.

Centralized scheduling mode: A mode of operation applicable to multihop relay where an MR-BS determines the bandwidth allocations without active participation of each RS in the cell, and generates the corresponding MAPs (or dictates the information used by RSs to generate their MAPs) for all access and relay links in the MR-cell.

Relay stations can be classified as transparent or non-transparent depending on whether or not they are capable of transmitting DL frame-start preamble, FCH, MAP message(s) and channel descriptor (DCD/UCD) messages. A non-transparent RS can transmit this information, whereas a transparent RS does not. Consequently, a non-transparent RS can operate in both centralized and distributed scheduling mode, while a transparent RS can only operate in centralized scheduling mode.

In the distributed scheduling mode, on the relay link, the contention-based CDMA bandwidth request process and its associated ranging codes may be the same as those used on the access link. Alternatively, a modification may be introduced into distributed scheduling on the relay link to accelerate the bandwidth request/allocation procedure in an IEEE 802.16j system. The MR-BS may assign unique RS CDMA ranging codes to each RS in its MR-cell for the purpose of requesting bandwidth from a super-ordinate station. The RS may reduce the latency of relaying traffic by sending a bandwidth request CDMA ranging code as soon as it receives one from a downstream station instead of waiting for the actual packets of user data to arrive (see FIG. 3).

In an IEEE 802.16j system, as well as two different scheduling modes, two different security modes are defined. The centralized security mode is based on key management between MR-BS and MS. The distributed security mode incorporates key management between MR-BS and access-RS and access-RS and MS. Shared security information between subordinate and super-ordinate nodes forms a "Security Association" (SA) including Traffic Encryption Keys (TEKs).

There are some messages which can only be transmitted on the access uplink. For example, in the distributed scheduling mode of a IEEE 802.16j system, a so-called SA-TEK 3-way handshake procedure can take place between access RS and MS. In such a case, if it is necessary for an MS to ask for bandwidth by sending a CDMA ranging code, the access RS receiving a conventional CDMA code cannot determine whether the bandwidth which the MS requires is for a multi-hop link or a single hop link. In such a situation, the access RS can respond to the CDMA bandwidth request in one of the following ways:

(i) the access RS waits for the actual packets of data to arrive from MS, then decides to request uplink bandwidth from the super-ordinate node; or (ii) the access RS sends a bandwidth request CDMA ranging code to the MR-BS before the actual packets from the MS start to arrive (as in FIG. 3 referred to above).

However, if the MS is asking for multi-hop link bandwidth, method (i) will lead to longer latency. On the other hand, if MS is asking for single hop link bandwidth, method (ii) will lead to an unnecessary bandwidth request being made, and to a wasteful bandwidth allocation on the uplink of the access RS (see FIG. 4). So, neither of these two methods meet the requirements of latency and bandwidth utility efficiency at the same time.

SUMMARY OF THE INVENTION

According to a first aspect of the present invention, there is provided a bandwidth request method in a multi-hop wireless network including at least one user terminal in wireless communication with a relay station, the relay station being in communication with other nodes in the network such that the user terminal can perform either single-hop communication with the relay station or multi-hop communication with one of the other nodes, the method comprising steps of: (a) assigning to the user terminal a specific signal for use in a bandwidth request pertaining to at least one of multi-hop and single hop communication, and notifying the user terminal of the specific signal; (b) the user terminal transmitting a bandwidth request to the relay station and indicating a single hop or multi-hop communication by including or not including said specific signal in said bandwidth request; and (c) the relay station processing said bandwidth request in accordance with the presence or absence of said specific signal.

In the above method, preferably, step (b) comprises the user terminal detecting the presence of one or more relay stations in the network for determining whether its bandwidth request is for single-hop or multi-hop communication.

Preferably also, step (c) includes, when the presence or absence of said specific signal indicates a multi-hop communication, the relay station itself transmitting a bandwidth request for obtaining bandwidth from a super-ordinate station of the relay station.

As a further preferred feature, step (a) further comprises the super-ordinate station notifying the specific signal to the relay station.

The above-mentioned specific signal may be a unique signal corresponding to the user terminal. It may be a first unique signal for a single hop bandwidth request and/or a second unique signal for a multi-hop bandwidth request. Alternatively, the specific signal may comprise a set of signals available in common to a plurality of the user terminals.

Preferably, step (a) includes notifying said specific signal to the user terminal during an entry procedure of the user terminal. Where a set of specific signals are used, step (a) may include notifying said set of signals to all of the plurality of user terminals.

Such notification may comprise the relay station notifying the user terminal of the specific signal. In a case where the system further comprises a base station in wireless communication with the user terminal, on the other hand, step (a) may comprise the base station notifying the user terminal of the specific signal.

In addition, step (b) may comprise the user terminal transmitting a ranging code, wherein said specific signal is constituted by the ranging code itself. Alternatively, step (b) may comprise the user terminal transmitting a bandwidth request header, with the specific signal being contained in the bandwidth request header.

As an example of the latter, the specific signal may include a connection identifier contained in the bandwidth request header. Thus, the user terminal may be assigned different connection identifiers for single-hop and/or multi-hop communication. Alternatively, there may be a plurality of user terminals to which collectively at least two subsets of connection identifiers are assigned, different subsets being reserved for single-hop or multi-hop communication.

In any of the above methods, the user terminal is preferably a mobile terminal and, for example, the network is an IEEE 802.16m network.

According to a second aspect of the present invention, there is provided a wireless communication system comprising at least one user terminal in wireless communication with a relay station, the relay station being in communication with at least one super-ordinate station in the system such that the user terminal can perform either single-hop communication with the relay station or multi-hop communication under supervision of the super-ordinate station, wherein: the system is arranged to notify the user terminal of a specific signal to be used for identifying a bandwidth request as pertaining to a multi-hop or a single hop communication; the user terminal is arranged to issue to the relay station a bandwidth request for a single hop or multi-hop communication by including or not including said specific signal in said bandwidth request; and the relay station is arranged to decide whether or not to issue a bandwidth request to the super-ordinate station in dependence upon the presence or absence of said specific signal.

In the above system, preferably, the super-ordinate station is arranged to notify said specific signal to the relay station.

The specific signal may comprise a first unique signal for a single hop bandwidth request and/or a second unique signal for a multi-hop bandwidth request. The specific signal may comprise a set of signals available in common to a plurality of the user terminals.

In one implementation of the invention, the system is an IEEE 802.16-based system. In this case the specific signal may include a CDMA code. Also, the specific signal may comprise a CID contained in a bandwidth request header.

In the above system, preferably, the user terminal is equipped to recognize the existence of the relay station and to use this recognition for determining whether the bandwidth request should be one for single-hop or for multi-hop communication.

According to a third aspect of the present invention, there is provided a mobile station for use in a multi-hop wireless communication system comprising bandwidth request means for generating a bandwidth request to obtain, from the system, bandwidth required to perform a desired communication, wherein the bandwidth request means are arranged to include, in said bandwidth request, an indication of whether the desired communication is a single-hop or a multi-hop communication.

In this mobile station, preferably, the bandwidth request means are arranged to include said indication by specifying a ranging code reserved for single hop or multi-hop communication. More particularly, the bandwidth request means may be arranged to include said indication by specifying a connection identifier reserved for single hop or multi-hop communication.

The mobile station is preferably further arranged to detect the presence of one or more relay stations in the system for determining whether the desired communication should be single-hop or multi-hop.

According to a fourth aspect of the present invention, there is provided a relay station for use in a wireless communication system comprising at least one user terminal in wireless communication with the relay station, and at least one super-ordinate station with which the relay station is in communication, the relay station configured to perform either single-hop communication with the user terminal independently of the super-ordinate station, or multi-hop communication in conjunction with the super-ordinate station; wherein the relay station is arranged to recognize at least one specific signal to be used for a bandwidth request pertaining to at least one of multi-hop and single hop communication, and arranged to decide whether or not to issue a bandwidth request to the super-ordinate station in dependence upon the presence or absence of said specific signal in a bandwidth request received from the user terminal. Preferably, the relay station receives advance notification of the specific signal from the super-ordinate station such as an MR-BS. The relay station or super-ordinate station may notify the user terminal of the specific signal(s) to be used.

Preferably the relay station is further arranged to receive advance notification of the specific signal from the super-ordinate station.

Moreover, the relay station may be arranged to notify the user terminal of said specific signal during an entry procedure conducted between the user terminal and the relay station. Each connection between the relay station and a user terminal may be given a connection ID and the relay station may be arranged to assign different connection IDs to the same user terminal for use in single hop and multi-hop communication respectively.

Thus, aspects of the invention provide a bandwidth request method, wireless communication system, a mobile station and a relay station. Additional aspects provide a base station and a supervisory element (such as a gateway) of a wireless communication system. The present invention also embraces computer software for making a transceiver unit of a wireless communication system act as the mobile station or relay station of the invention.

BRIEF DESCRIPTION OF THE DRAWINGS

Preferred features of the present invention will now be described, by way of example, with reference to the accompanying drawings, in which:—

DETAILED DESCRIPTION

Figure 1A:
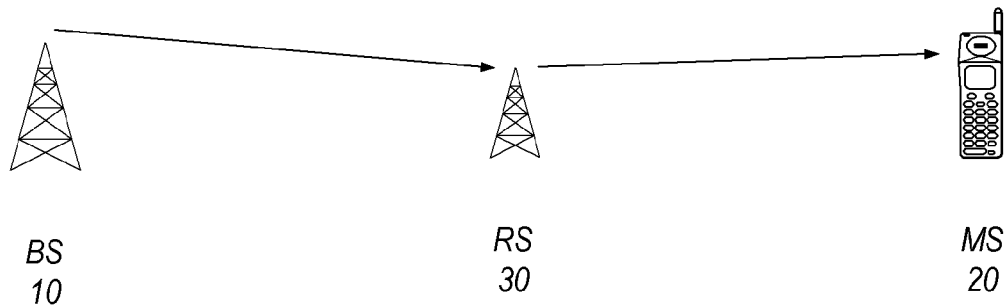
FIG. 1a shows a two-hop wireless communication system with a relay station RS.
Figure 1B:
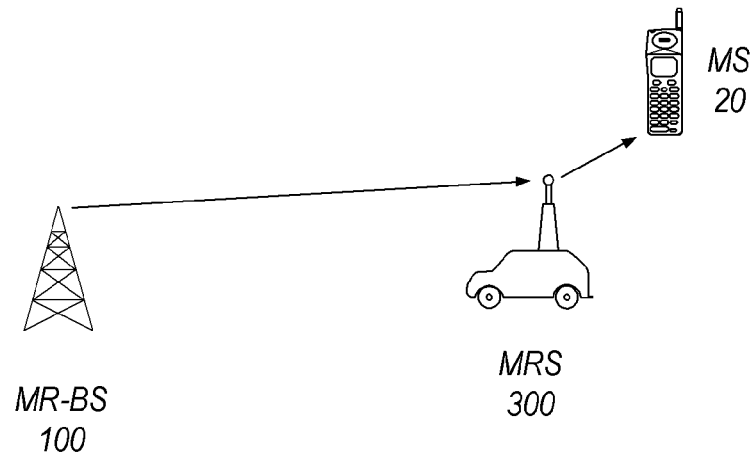
FIG. 1b shows a two-hop wireless communication system with a mobile relay station MRS.
Figure 2A:
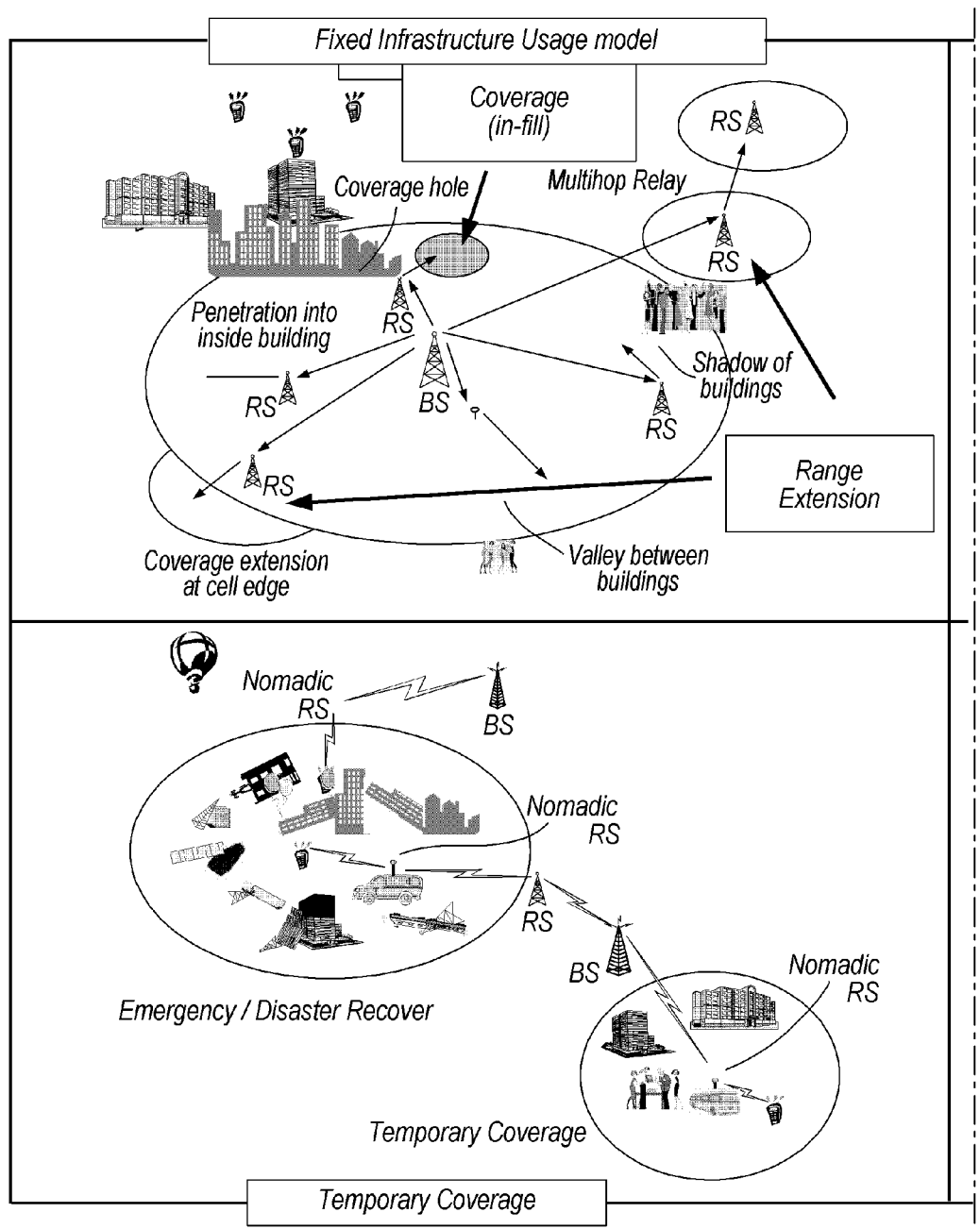
FIGS. 2a and 2b show applications of relay stations.
Figure 2B:
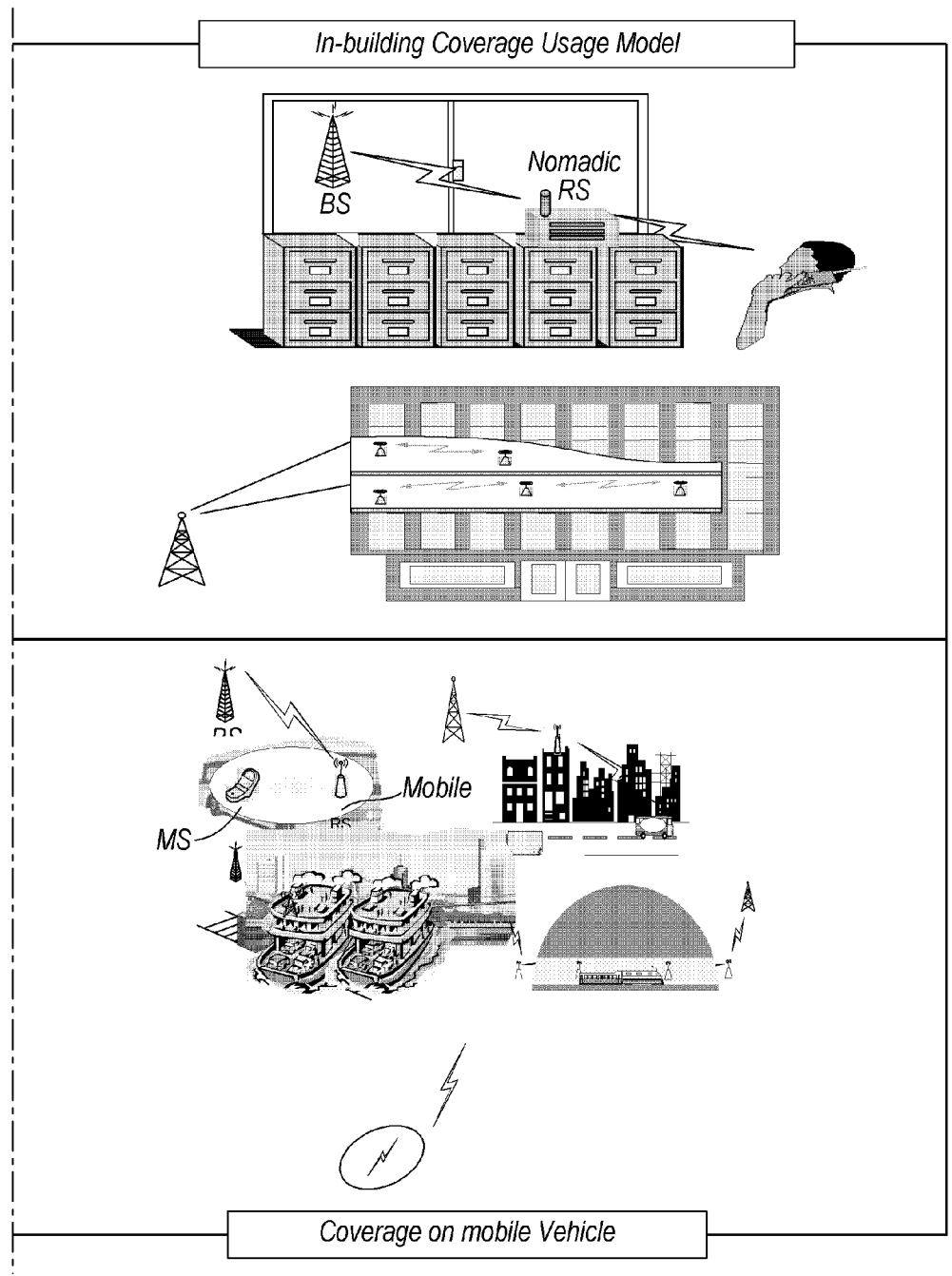
Figure 3:
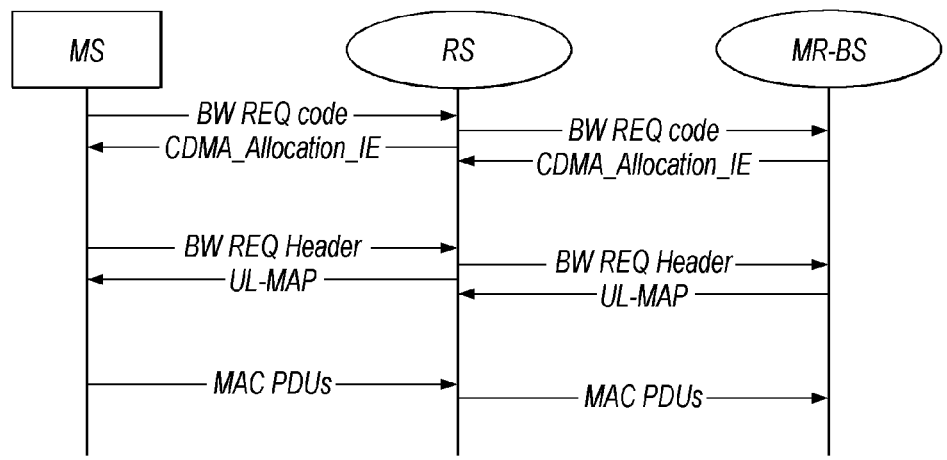
FIG. 3 shows one possible technique for reducing latency of relay traffic.
Figure 4:
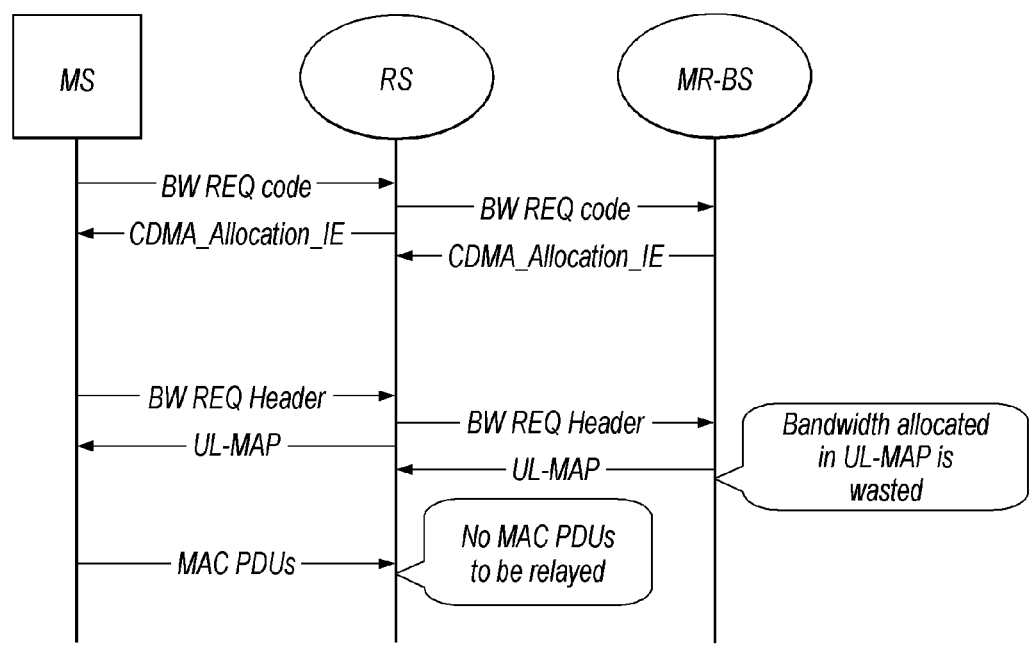
FIG. 4 shows a problem of an unnecessary bandwidth request/allocation resulting from use of the FIG. 3 technique.

An embodiment of the present invention will now be described, taking a WiMAX system as an example. Various WiMAX standards have been proposed or are under development. IEEE 802.16d is envisaged primarily for fixed subscriber stations (SS). IEEE 802.16e is a standard which allows for mobile stations, and IEEE 802.16j is a further refinement of the standard, currently under development, which permits relay stations to be included in an 802.16e type system without changing the specifications of MSs. Meanwhile, IEEE 802.16m is a further variation in which the specifications of the mobile stations are changed, among other things to make them "relay-aware", or in other words capable of detecting that they are communicating with an RS rather than directly with a BS. The full contents of IEEE Std 802.16-2004 "Air Interface for Fixed Broadband Wireless Access Systems" and IEEE Std 802.16e-2005 "Amendment 2 and Corrigendum 1 to IEEE Std 802.16-2004" are hereby incorporated by reference. The embodiments to be described are of particular relevance to proposed 802.16m systems, which although not finalized in terms of their technical features, will employ many of the same principles and techniques set out in the above standards.

In summary, the invention proposes a new bandwidth request method that can reduce the latency of bandwidth requests and enhance the bandwidth utilization efficiency of the relay-link (BS-RS) in a multi-hop relay enabled network. In a relay system, there are some messages which have only to be transmitted on the access-uplink (MS to RS), whilst other messages are transmitted across multiple hops (access-uplink (MS-RS) and relay-uplink (RS-BS)). Depending on the type of control message to be transmitted, the MS can select the appropriate bandwidth request signal to request bandwidth from the access RS. Meanwhile the RS, upon receiving the bandwidth request signal, and based on the type and/or content of the bandwidth request signal, can decide whether to request the bandwidth from its super-ordinate station. The effect is to improve the relay-link utilization efficiency by avoiding unnecessary bandwidth allocation(s) in the relay link.

As already mentioned, a problem exists in the BW request procedures proposed to date, in that a RS receiving a BW request from an attached MS either has to wait to determine whether bandwidth needs to be requested from an upstream node, increasing latency, or else it makes such a request without waiting, with the risk that (in a single hop case) the bandwidth is wasted. With the expected introduction of "relay-aware" systems such as IEEE 802.16m, it would be desirable to provide a procedure for bandwidth requests between an MS and its RS capable of distinguishing between the single-hop and multi-hop case.

To solve the above mentioned problem, in a relay system, embodiments of the present invention allocate specific signals to MSs for single and/or multi hop bandwidth requests only. The access RS has knowledge of such specific signals, typically through receiving advance notification from its super-ordinate station such as an MR-BS. Upon receiving such signals, the access RS can quickly decide whether to ask for the bandwidth from the super-ordinate node or not. The method can be implemented by two phases:

a) System configuration: The relay system should allocate specific bandwidth request signal(s) to MSs for requesting the access and/or multi-hop uplink bandwidth. This will normally include advising both MSs and access RS of the allocated signal(s).

b) Bandwidth request for access link: When MS needs to request access uplink bandwidth, it can transmit such signal to access RS. Based on the received signal type and/or content, the access RS can decide whether or not it needs to require bandwidth from the super-ordinate node.

Figure 5:
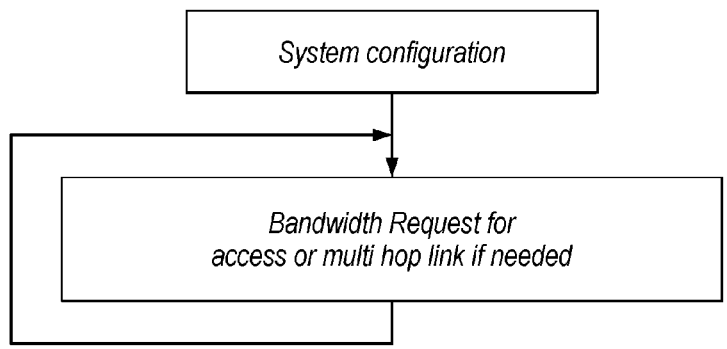
FIG. 5 is a conceptual flowchart of the principle of the present invention.

The detailed procedure for new bandwidth request method can be divided into two phases (see FIG. 5):

a) System configuration b) If it is needed, bandwidth request for access link or multi hop link Implementation of these two phases is, for example, as follows.

Phase a) System Configuration

Step 1: The wireless relay system configures at least one specific bandwidth request signal only used for single and/or for multi-hop bandwidth request. To implement this, each MS can be assigned a unique signal reserved for single or multi-hop bandwidth requests, or the MSs can be assigned several signals concurrently for single hop and multi-hop bandwidth requests respectively. Alternatively, many MSs can share a bandwidth request signal subset for single or multi-hop bandwidth requests.

Step 2: Allocate bandwidth request signal(s) for single and/or multi-hop bandwidth request to particular MS(s). If each MS is assigned an unique bandwidth request signal for single or multi-hop bandwidth or signals for single and multi-hop bandwidth, such signal(s) may be assigned during the network entry procedure, especially during the initial ranging process or in any phase before the MS needs to use such bandwidth request signal(s). If many MSs share a signal subset, such subset may be indicated to the MS during the initial network entry procedure or in any phase before the MS needs to request bandwidth.

From the above, it will be noted that assigning the unique signal (specific signal) is distinct from allocating such a signal to an individual MS. Assigning of the unique signal(s) may take place at the system level, for example through a supervisory station (gateway) controlling all the MR-BSs in the system. Allocating the specific signal may take place at the access network level, such as during an entry procedure conducted between the MS and its access RS. Alternatively, the MR-BS may be able to inform MS of its allocated signal directly, or it may be allocated in some other way.

Figure 6:
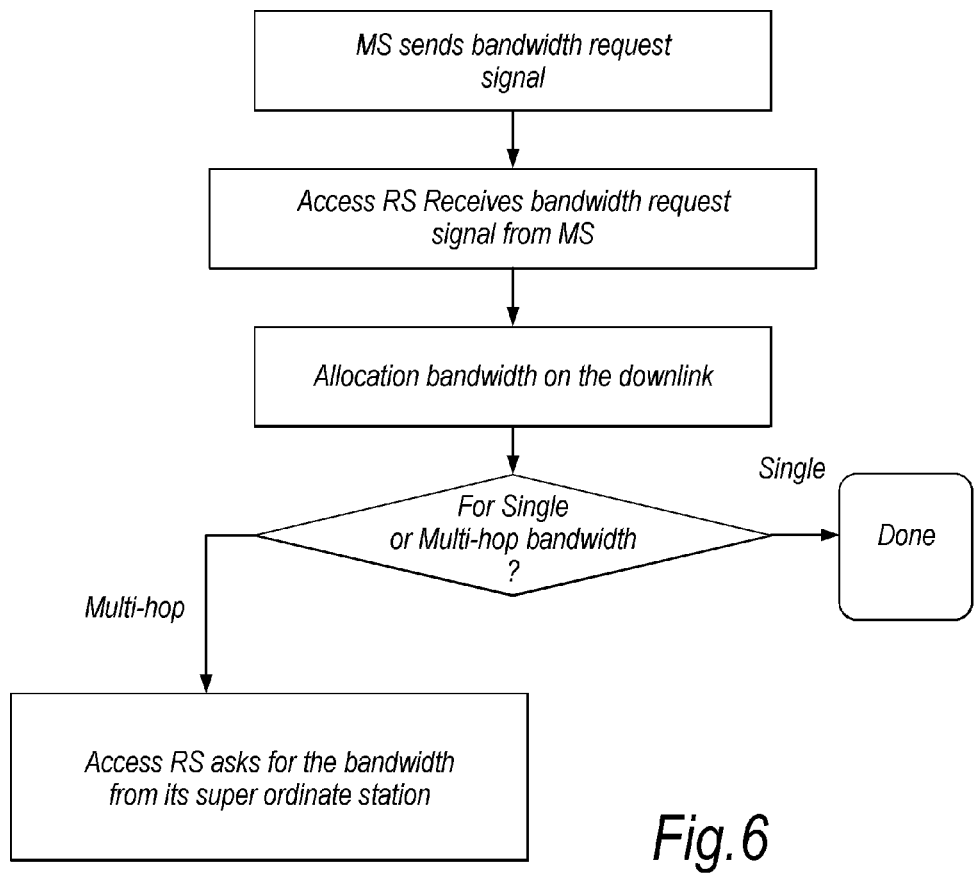
FIG. 6 is a flowchart of a bandwidth request/allocation method embodying the present invention for an access link.

Phase b) Bandwidth Request for Access or Multi Hop Link (See FIG. 6):

Step 1: When MS requires bandwidth from the access RS, it sends a different bandwidth request signal to request bandwidth based on the requested bandwidth type, that is: bandwidth for multi-hop path or single-hop path.

Step 2: On receiving a bandwidth request signal, the access RS allocates bandwidth (on the uplink MS-to-RS) to the MS. At the same time, the access RS can decide whether to ask for the bandwidth from the super-ordinate node, based on the bandwidth request signal type and/or content.

Two examples or embodiments of the above principle will now be explained.

EXAMPLE ONE

Here the bandwidth request signal is a CDMA code, which is one of the known types of bandwidth request referred to earlier.

Phase a) System Configuration

Step 1: The wireless relay system sets aside some CDMA codes only to be used for single-hop bandwidth requests. To implement this, each MS can be assigned a unique code, or many mobile stations can share an CDMA code subset for single hop bandwidth requests.

Step 2: Allocate CDMA codes for single hop bandwidth to individual MS(s). If each MS is assigned an unique CDMA code, such code can be assigned during the network entry procedure, especially during the initial process. If many MSs share a code subset, such subset should be indicated to the MS during the initial network entry procedure. In the former case, at least the access RS should know the CDMA code assigned to its subordinate MS; in the latter case, the assignment should be known by all the MSs and access RSs.

Figure 7:
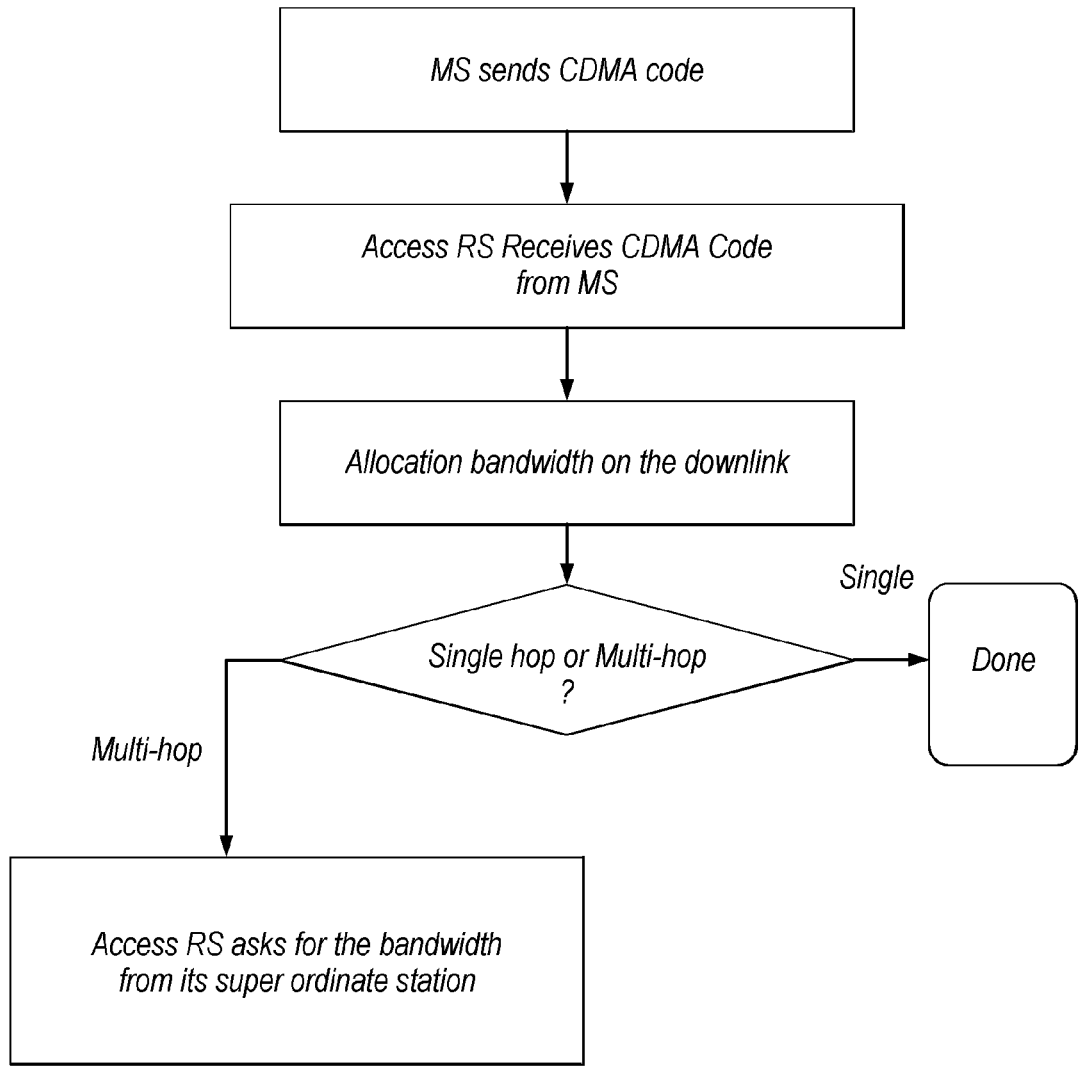
FIG. 7 is a flowchart of a first example of the method embodying the present invention, using a CDMA code.

Phase b) Bandwidth Request for Access Link (See FIG. 7):

Step 1: When MS requires the bandwidth from the access RS, it sends different CDMA codes to request bandwidth based on the requested bandwidth type, that is: multi-hop path or single-hop path.

Step 2: On receiving an CDMA code, the access RS allocates the bandwidth to the MS. At the same time, the access RS can decide whether to ask for the bandwidth from the super-ordinate node or not, based on the CDMA code type.

Step 3: In the case of a multi-hop link, when multi-hop link bandwidth is required, the access RS itself issues a bandwidth request to the super-ordinate node (e.g. MR-BS).

EXAMPLE TWO

Here the bandwidth request signal is a bandwidth request header. This type of bandwidth request is again known in principle, as already outlined.

Phase a) System Configuration

Step 1: The wireless relay system reserves some single CIDs (connection IDs) for exclusive use for single hop links.

Step 2: The system (usually through the MR-BS) allocates single CIDs to the MS(s). If each MS is assigned a unique single CID, such CID may be assigned during the network entry procedure, especially during the initial process. If many MSs share a singe CID subset, such subset should be indicated to the MS during the initial network entry procedure. In the former case, at least the access RS should know the single CID assigned to its subordinate MS, in the latter case, the assignment should be known by all the MSs and access RSs.

Figure 8:
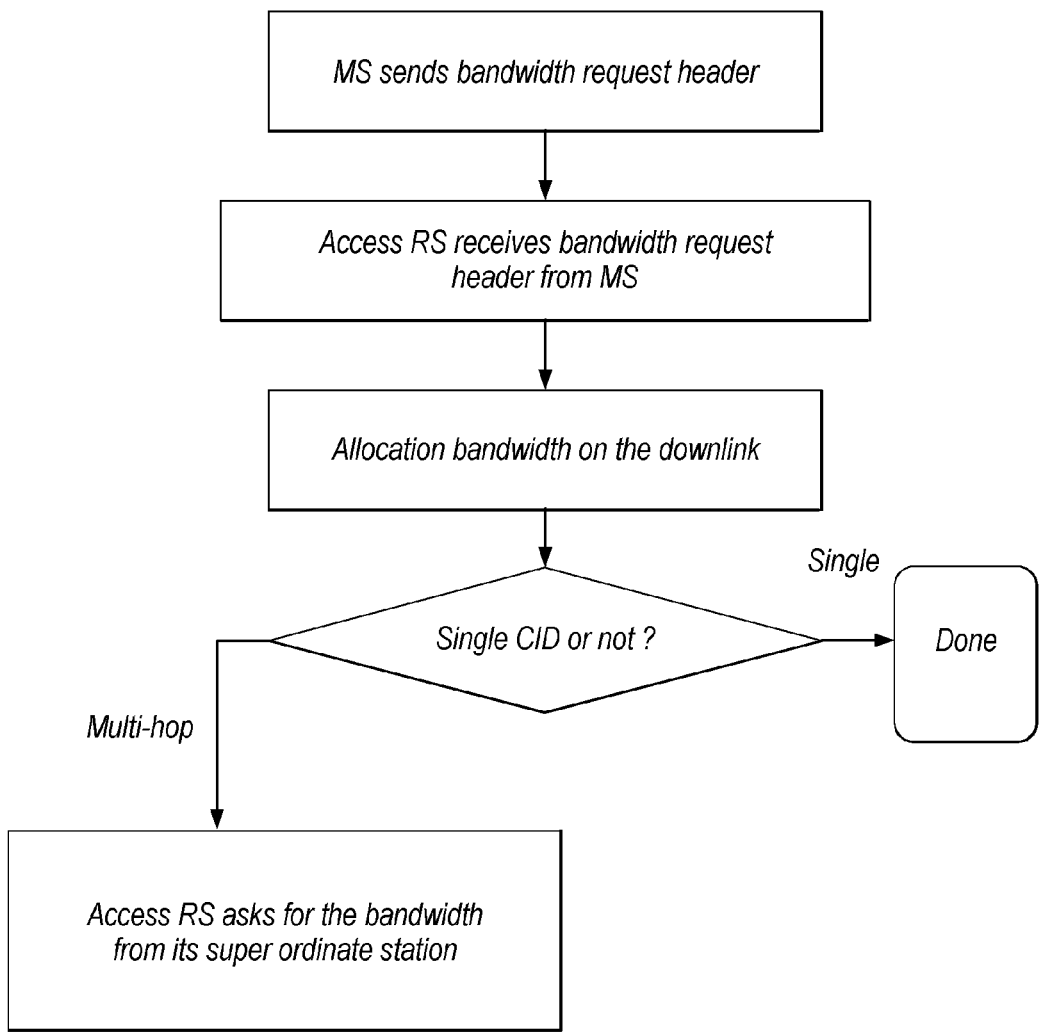
FIG. 8 is a flowchart of a second example of the method embodying the present invention, using a bandwidth request header.

Phase b) Bandwidth Request for Access Link (See FIG. 8):

Step 1: When MS requires the bandwidth from the access RS, it sends a bandwidth header containing a different CID to request bandwidth based on the requested bandwidth type, that is: multi-hop path or single-hop path.

Step 2: On receiving the bandwidth request header, the access RS allocates bandwidth to the MS. At the same time, the access RS can decide whether to ask for bandwidth from the super-ordinate node, based on the CID type contained in the bandwidth header.

Step 3: In the case of a multi-hop link, when multi-hop link bandwidth is needed, the access RS asks for the bandwidth further.

Whilst the above description has referred to mobile stations by way of example, it would be possible to employ the present invention with user equipment (UEs) in general even if they are fixed.

Thus, an embodiment of the present invention can provide a wireless communication system comprising at least one user terminal (MS) in wireless communication with a relay station (access RS), the relay station being in communication with at least one super-ordinate station in the system such as a base station (MR-BS) such that the user terminal can perform either single-hop communication with the access relay station or multi-hop communication with the access RS's super-ordinate station or BS. The system assigns, or reserves, at least one specific signal to be used in a bandwidth request for multi-hop and/or single hop communication, and preferably the relay station is arranged to notify the user terminal in advance of this signal, for example during a network entry procedure. This specific signal can be a specific CDMA code (or one of a set of codes), or a distinct CID, reserved for either single or multi-hop. Then, when the user terminal needs bandwidth, it issues a bandwidth request to the relay station indicating a single hop or multi-hop communication by including or not including the specific signal. The relay station decides whether or not to issue its own bandwidth request to the super-ordinate station based on the presence or absence of the specific signal. In this way, latency of bandwidth requests is reduced without needless allocation of bandwidth at the super-ordinate station. In other words the present invention can enhance the bandwidth utility efficiency, compared with the situation without distinguishing one-hop from multi-hop bandwidth requests.

The above description refers to assigning or reserving at least one specific code or signal for single-hop links. This may be the most efficient technique in a system where multi-hop links are more common than single-hop. However, if desired the special code/signal may instead be assigned for multi-hop. It is sufficient to distinguish only one type out of single and multi-hop bandwidth requests in said special codes/signals, in which case the other type is indicated by the absence of the special code/signal in a bandwidth request. Alternatively, different codes/signals may be provided for both single and multi-hop so as to identify both types positively by the presence of one or other code/signal(s) in a bandwidth request.

The proposed invention is suitable for a system where mobile stations are aware of the presence of relays stations in the network. At present, among standards currently under development, this would include an IEEE 802.16m system.

Whilst the above description has explained a procedure or method embodying the present invention, it will be apparent to those skilled in the art that the procedure is carried out by elements of a wireless communication system including mobile stations, relay stations and base stations. Embodiments of the present invention may be implemented in hardware, or as software modules running on one or more processors, or on a combination thereof. That is, a microprocessor or digital signal processor (DSP) may be used in practice to implement some or all of the functionality of a relay station embodying the present invention. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form. As will also be apparent to those skilled in the art, in some instances, mobile relay stations of a wireless communication system may be constituted by MSs/UEs of the system, when at least some of the available MSs/UEs have the capability to relay data to and from other MSs/UEs. Thus, a program embodying the invention could also be used to add the functionality of the RS as described above to a mobile station or other user equipment having suitable hardware.

The invention claimed is:

1. A bandwidth request method in a multi-hop wireless network including at least one user terminal in wireless communication with a relay station, the relay station being in communication with other nodes in the network such that the user terminal can perform either single-hop communication with the relay station or multi-hop communication with one of the other nodes, the method comprising steps of:
    (a) notifying the user terminal of a specific signal assigned for use in a bandwidth request pertaining to one of multi-hop and single hop communication;
    (b) the user terminal transmitting a bandwidth request to the relay station and indicating a single hop or multi-hop communication by selectively including said specific signal in said bandwidth request; and
    (c) the relay station processing said bandwidth request in accordance with the presence or absence of said specific signal.

2. The bandwidth request method according to claim 1 wherein step (b) comprises the user terminal detecting the presence of one or more relay stations in the network for determining whether its bandwidth request is for single-hop or multi-hop communication.

3. The bandwidth request method according to claim 1 wherein step (c) includes, when the presence or absence of said specific signal indicates a multi-hop communication, the relay station itself transmitting a bandwidth request for obtaining bandwidth from a super-ordinate station of the relay station.

4. The bandwidth request method according to claim 3 wherein step (a) further comprises the super-ordinate station notifying the specific signal to the relay station.

5. The bandwidth request method according to claim 1 wherein said specific signal comprises a first unique signal for a single hop bandwidth request and/or a second unique signal for a multi-hop bandwidth request, each unique signal corresponding to the user terminal.

6. The bandwidth request method according to claim 1 wherein said specific signal comprises a set of signals available in common to a plurality of the user terminals.

7. The bandwidth request method according to claim 1 wherein step (a) includes notifying said specific signal to the user terminal during an entry procedure of the user terminal.

8. The bandwidth request method according to claim 1 wherein step (b) comprises the user terminal transmitting a ranging code and wherein said specific signal is constituted by the ranging code itself.

9. The bandwidth request method according to claim 1 wherein step (b) comprises the user terminal transmitting a bandwidth request header and said specific signal is contained in the bandwidth request header.

10. The bandwidth request method according to claim 9 wherein said specific signal comprises a connection identifier contained in the bandwidth request header.

11. A wireless communication system comprising at least one user terminal in wireless communication with a relay station, the relay station being in communication with at least one super-ordinate station in the system such that the user terminal can perform either single-hop communication with the relay station or multi-hop communication under supervision of the super-ordinate station, wherein: the system is arranged to notify the user terminal of a specific signal to be used for identifying a bandwidth request as pertaining to a multi-hop or a single hop communication; the user terminal is arranged to issue to the relay station a bandwidth request for single hop or multi-hop communication by selectively including said specific signal in said bandwidth request; and the relay station is arranged to decide whether or not to issue a bandwidth request to the super-ordinate station in dependence upon the presence or absence of said specific signal.

12. A mobile station for use in a multi-hop wireless communication system, the mobile station arranged to receive notification from the system of a specific signal to be used for identifying a bandwidth request as pertaining to a multi-hop or a single hop communication, and comprising bandwidth request means for generating a bandwidth request to obtain, from the system, bandwidth required to perform a desired communication, wherein the bandwidth request means are arranged to include, in said bandwidth request, said specific signal as an indication of whether the desired communication is a single-hop or a multi-hop communication.

13. A relay station for use in a wireless communication system comprising at least one user terminal in wireless communication with the relay station, and at least one super-ordinate station with which the relay station is in communication, the relay station configured to perform either single-hop communication with the user terminal independently of the super-ordinate station, or multi-hop communication in conjunction with the super-ordinate station; wherein the relay station is arranged to recognise a specific signal to be used for a bandwidth request pertaining to one of multi-hop and single hop communication, and arranged to decide whether or not to issue a bandwidth request to the super-ordinate station in dependence upon the presence or absence of said specific signal in a bandwidth request received from the user terminal.

* * * * *